Patented Apr. 19, 1949

2,467,915

UNITED STATES PATENT OFFICE 2,467,915

CATALYST FOR ACID CURING THERMOSETTING RESINS

Milton J. Scott, Springfield, Mass., assignor to Monsanto Chemical Company, St. Louis, Mo., a corporation of Delaware No Drawing. Application December 11, 1945, Serial No. 634,400

8 Claims. (Cl. 260—67.6)

This invention relates to thermosetting compositions comprising acid curing thermosetting resins and a novel latent curing catalyst.

The acid curing thermosetting resins of this invention are thermosetting compositions which can be molded under heat and pressure to provide insoluble, infusible, finished articles. It has been found desirable to add to the thermosetting compositions an acid catalyst to speed the final hardening of the material and thus substantially shorten the molding cycle.

It has further been found that catalysts active under all conditions are not suitable for incorporation in the compositions of this invention since they cause the materials to harden or cure during storage and impart undesired properties to the finished articles.

To overcome these difficulties, the art has turned to the use of catalysts of the latent type, i. e., catalysts which remain inactive until heated with the resinous compositions to molding temperatures. The latent catalysts used heretofore have been deficient in one or more of the properties required, i. e., they have either undercatalysed or overcatalysed the reaction and when used in quantities sufficient to modify their reactivity have imparted undesired properties to the finished article such as a decrease in electrical resistance, an increase in moisture absorption, an increase in the color or a decrease in weather resistance.

One object of this invention is to provide a latent catalyst for admixture with acid curing thermosetting resins.

Another object is to provide a latent catalyst for admixture with amino-aldehyde reaction products which will promote the cure of the reaction products without impairing the properties of the finished product.

These and other objects are attained by admixing o-xenyl phosphoryl diamide with the acid curing thermosetting resins.

The following examples are given in illustration and are not intended to limit the scope of this invention. Where parts are mentioned, they are parts by weight.

Example I 100 parts of liquid urea-formaldehyde reaction product were added to 85 parts by weight of alpha cellulose. The materials were mixed until the liquid resin was uniformly absorbed by the cellulose. This mixture was then dried until essentially free of water in a ventilated oven at 150° F. This dried composition was ground in a ball mill with ¾% of o-xenyl phosphoryl diamide. The powder was molded into a disc at 150° C. and 4000 p. s. i. for 75 seconds. The product had a hard brilliant surface and showed very low water absorption. The molding powder was stable in storage indefinitely.

Example II 100 parts of a melamine-formaldehyde reaction product in the fusible state were mixed with 0.5 part of o-xenyl phosphoryl diamide and ground to form a homogeneous molding powder. 70 parts of walnut shell flour were intimately mixed with the ground up resin and catalyst in a ball mill. The resulting composition was stable in storage and could be molded without difficulty under conventional molding conditions to provide a dimensionally stable article having exceptional electrical properties.

Example III 80 parts of alpha cellulose were impregnated with 120 parts of an urea-melamine-formaldehyde reaction product. The material was dried and ground in a ball mill together with one part zinc stearate as a mold lubricant and 0.5 part of o-xenyl phosphoryl diamide. The resultant molding powder was stable in storage and cured rapidly under conventional molding conditions.

The amino-aldehyde reaction products which may be catalysed with o-xenyl phosphoryl diamide are products of the reaction between various amino compounds, and their derivatives and various aldehydes. The amino compounds which may be used include urea, thiourea, aminotriazines, aminodiazines, mixtures of the above, and derivatives of the above such as alkylol ureas, alkylol aminotriazines, ethers of alkylol ureas, ethers of alkylol aminotriazines, etc. A mixture of the amino compounds may be used.

O-xenyl phosphoryl diamide is a solid material which melts at 151° C. without decomposition. When used as a latent catalyst in the amino-aldehyde reaction products, it has the unexpected property of resisting the action of heat for a short time and then breaks down relatively slowly to provide the acid conditions requisite to curing the resins. This property is of particular advantage for producing large moldings since it provides an opportunity to heat uniformly, large amounts of the molding powder before curing starts with the result that a more uniform and homogeneous cure is obtained.

In addition to the above advantage, o-xenyl phosphoryl diamide appears to cause a decrease in the moisture sensitivity of the molded objects.

This effect may be due to a more complete cure effected by the use of o-xenyl phosphoryl diamide or to some other reason which is not apparent.

In place of the alpha cellulose and nut shell fibers described in the Examples, other fillers such as macerated fabric, wood flour, etc. may be used. Other conventional modifiers such as lubricants, pigments, dyes, etc. may also be incorporated in the compositions of this invention.

The amount of o-xenyl phosphoryl diamide used to accelerate the cure of the acid curing thermosetting resins may be varied from about 0.1 to about 1.0 part per 100 parts of the resin, depending on the speed of cure desired.

The use of o-xenyl phosphoryl diamide as a latent catalyst for acid curing thermosetting resins does not advance the cure of the reaction products during storage, but accelerates the cure of the reaction products under conventional molding conditions without adversely affecting the physical and electrical properties of the molded products.

It is obvious that many modifications and variations in the processes and compositions described above may be made without departing from the spirit and scope of the invention as defined in the appended claims.

What is claimed is:

1. A composition which is substantially stable at normal temperatures comprising an acid-curing thermosetting resin taken from the group consisting of the aldehyde reaction products of urea, thiourea, aminotriazines, and aminodiazines and a small amount of o-xenyl phosphoryl diamide.

2. A composition which is substantially stable at normal temperatures comprising an acid-curing melamine-formaldehyde reaction product and a small amount of o-xenyl phosphoryl diamide.

3. A composition which is substantially stable at normal temperatures comprising an acid-curing melamine-urea-formaldehyde reaction product and a small amount of o-xenyl phosphoryl diamide.

4. A composition which is substantially stable at normal temperatures comprising an acid-curing urea-formaldehyde reaction product and a small amount of o-xenyl phosphoryl diamide.

5. A composition which is substantially stable at normal temperatures comprising 100 parts of an acid-curing thermosetting resin taken from the group consisting of the aldehyde reaction products of urea, thiourea, aminotriazines, and aminodiazines and from 0.1 to 1.0 part of o-xenyl phosphoryl diamide.

6. A composition as in claim 5 wherein the acid-curing thermosetting resin is a melamine-formaldehyde reaction product.

7. A composition as in claim 5 wherein the acid-curing thermosetting resin is a urea-formaldehyde reaction product.

8. A composition as in claim 5 wherein the acid-curing thermosetting resin is a reaction porduct of formaldehyde, urea and melamine.

MILTON J. SCOTT.

REFERENCES CITED

The following references are of record in the file of this patent:

UNITED STATES PATENTS

| Number | Name | Date |
|---|---|---|
| 2,343,247 | Simons | Mar. 7, 1944 |
| 2,385,713 | Kosolapoff | Sept. 25, 1945 |